(12) United States Patent
Soma et al.

(10) Patent No.: US 8,174,199 B2
(45) Date of Patent: May 8, 2012

(54) DISCHARGE LAMP LIGHTING APPARATUS, METHOD FOR CONTROLLING THE SAME, AND PROJECTOR

(75) Inventors: Shigeyasu Soma, Muroran (JP); Kentaro Yamauchi, Ashiya (JP)

(73) Assignee: Seiko Epson Corporation, Tokyo (JP)

( * ) Notice: Subject to any disclaimer, the term of this patent is extended or adjusted under 35 U.S.C. 154(b) by 374 days.

(21) Appl. No.: 12/402,796

(22) Filed: Mar. 12, 2009

(65) Prior Publication Data

US 2009/0231554 A1  Sep. 17, 2009

(30) Foreign Application Priority Data

Mar. 17, 2008 (JP) ................................. 2008-067664

(51) Int. Cl.
 *H05B 37/00* (2006.01)
(52) U.S. Cl. .................... 315/209 R; 315/224; 315/291; 315/326
(58) Field of Classification Search .................. 315/194, 315/195, 209 R, 224, 291, 287, 294, 297, 315/299, 300, 301, 302, 307, 308, 326
See application file for complete search history.

(56) References Cited

U.S. PATENT DOCUMENTS

| 5,608,294 | A  | * | 3/1997 | Derra et al. .................... 315/224 |
| 6,215,252 | B1 |   | 4/2001 | Stanton |
| 6,239,556 | B1 |   | 5/2001 | Derra et al. |
| 7,327,096 | B2 |   | 2/2008 | Mönch et al. |

FOREIGN PATENT DOCUMENTS

| JP | A-10-501919 | 2/1998 |
| JP | A-2002-134287 | 5/2002 |
| JP | A-2002-534766 | 10/2002 |
| JP | A-2003-257689 | 9/2003 |
| JP | A-2004-165006 | 6/2004 |
| JP | A-2005-531117 | 10/2005 |
| JP | A-2009-508300 | 2/2009 |
| JP | A-2009-110918 | 5/2009 |
| WO | WO 95/35645 | 12/1995 |
| WO | WO 2007/031900 A1 | 3/2007 |

* cited by examiner

*Primary Examiner* — Douglas W Owens
*Assistant Examiner* — Jianzi Chen
(74) *Attorney, Agent, or Firm* — Oliff & Berridge, PLC

(57) ABSTRACT

A discharge lamp lighting apparatus includes a power control circuit that outputs a DC current, an AC conversion circuit to which the DC current is inputted, the AC conversion circuit repeatedly reversing the polarity of the DC current between a first polarity and a second polarity at predetermined timings to produce and output a discharge lamp driving AC current, and a controller that controls the AC conversion circuit to perform AC conversion control in which the timings at which the polarity of the discharge lamp driving AC current is reversed are controlled and controls the power control circuit to perform section current control in which the magnitude of the DC current is controlled in each polarity reverse timing section. In the section current control, the magnitude of the DC current is controlled in accordance with a periodic pattern in each of the polarity reverse timing sections to control the ratio of accumulated energy supplied to each electrode of the discharge lamp in the first half of the polarity reverse timing section to that in the second half of the polarity reverse timing section.

20 Claims, 13 Drawing Sheets

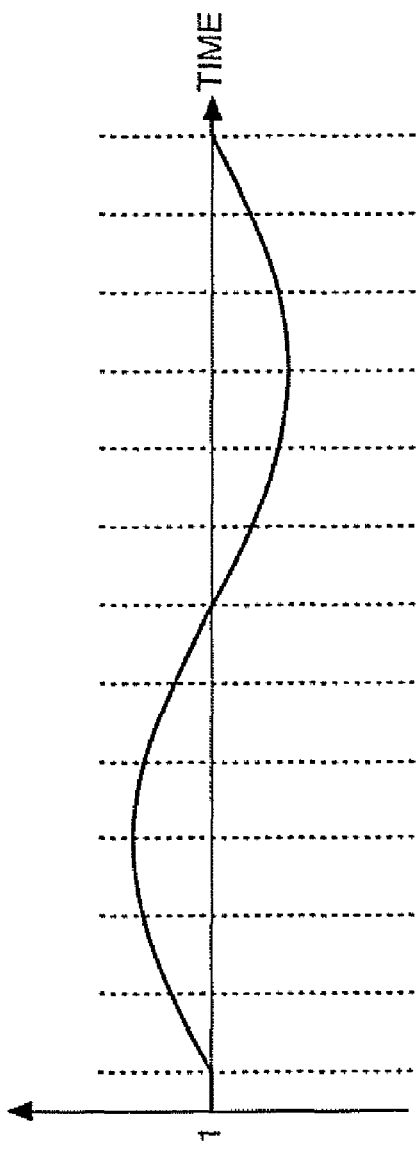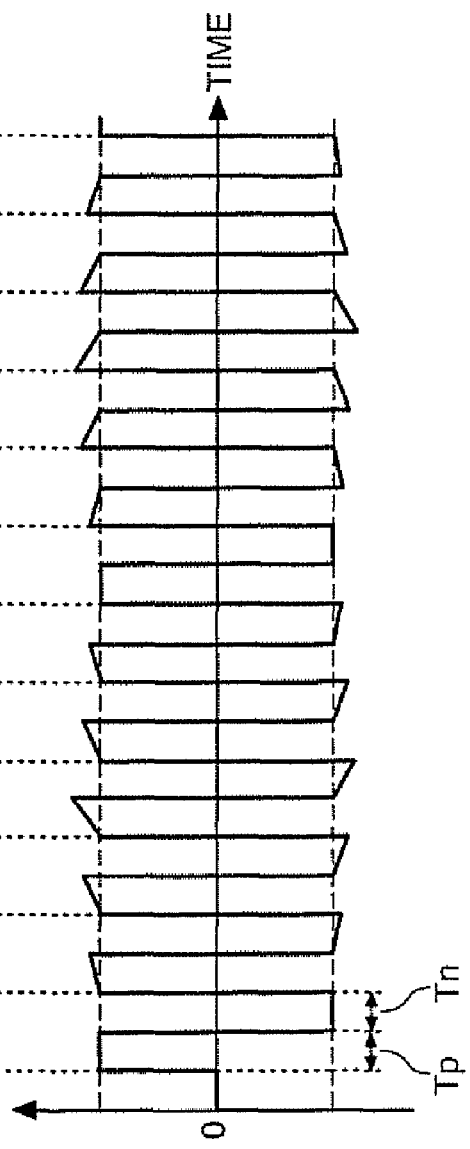
FIG. 7A
FIG. 7B

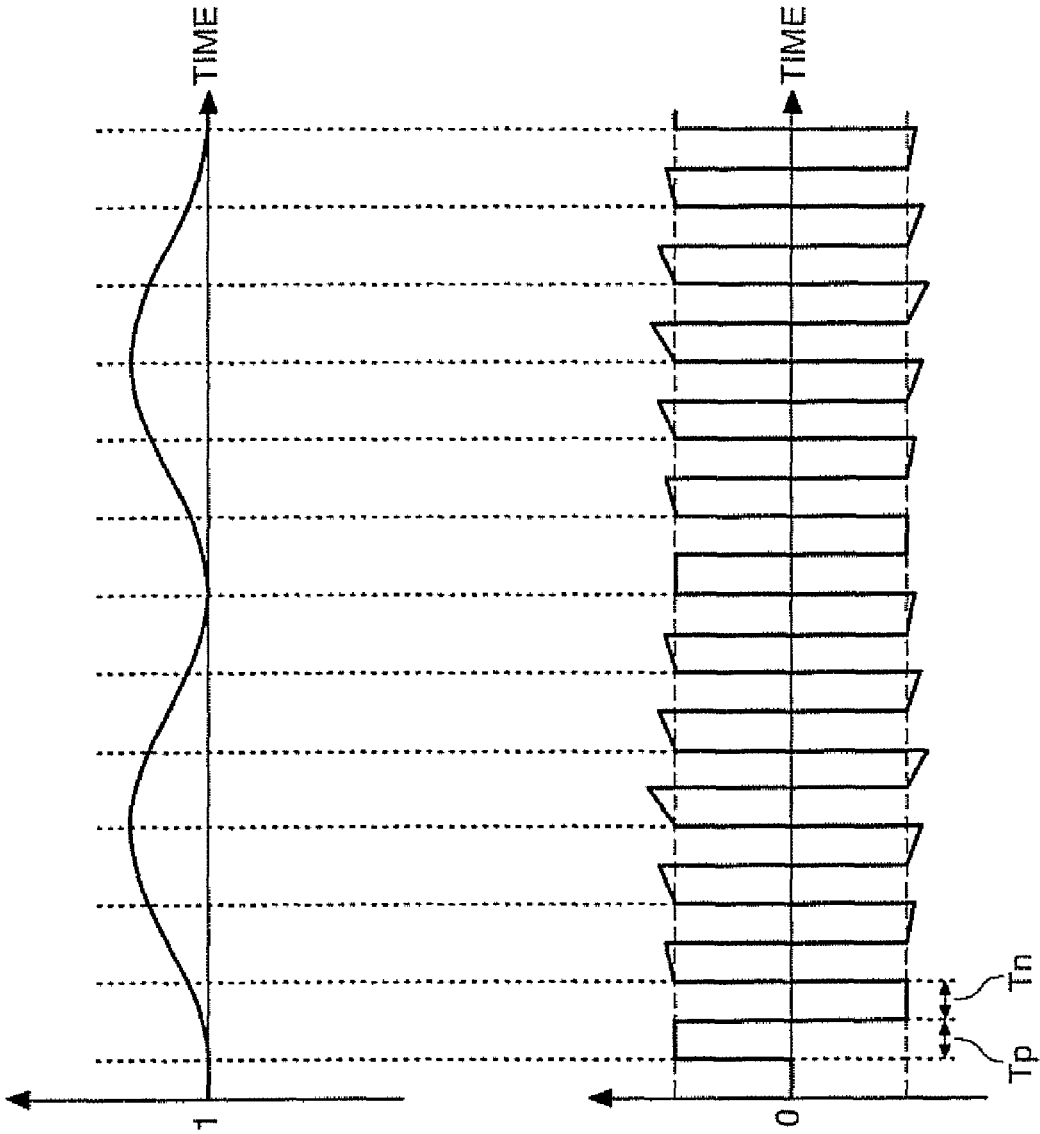

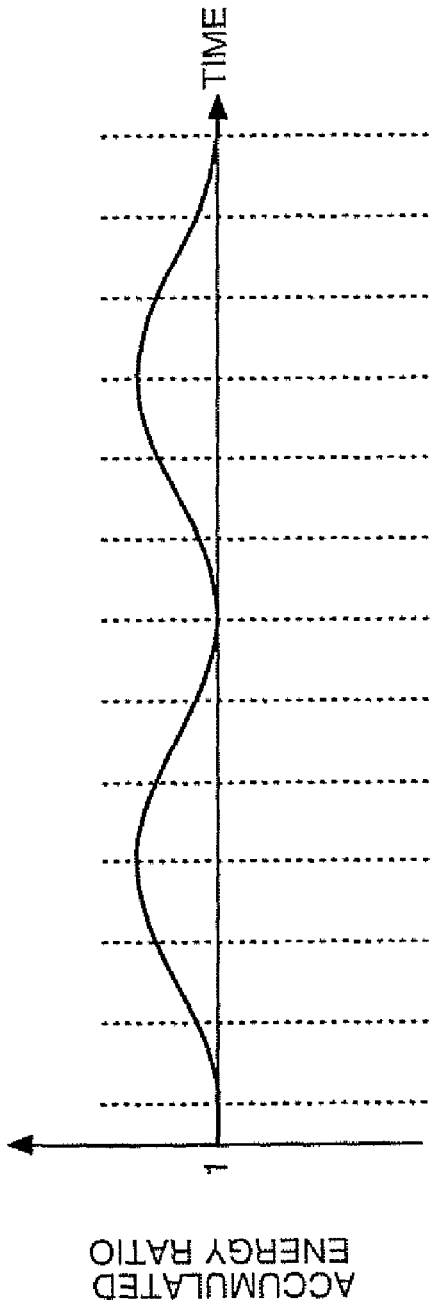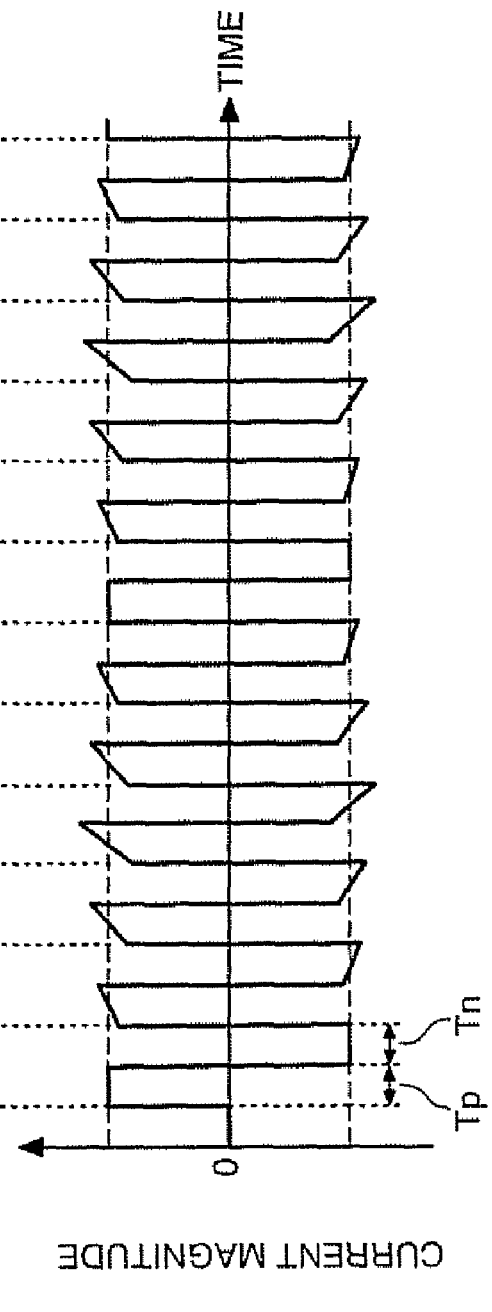

DISCHARGE LAMP LIGHTING APPARATUS, METHOD FOR CONTROLLING THE SAME, AND PROJECTOR

BACKGROUND

1. Technical Field

The present invention relates to a discharge lamp lighting apparatus, a method for controlling the same, and a projector.

2. Related Art

A high-pressure mercury lamp, a metal halide lamp, and other discharge lamps are used as the light source of a projector. In such discharge lamps, discharging causes electrode consumption, which changes the shapes of the electrodes, sometimes resulting in flickering in which the discharge start position abruptly changes. Flickering undesirably changes the luminance of the discharge lamp abruptly and greatly.

To solve the above problem, JP-T-10-501919 discloses a discharge lamp driving method for suppressing flickering by increasing the magnitude of a discharge lamp AC driving current in the second half of the half cycle of the AC driving current.

However, when the method described in JP-T-10-501919 is used to continuously drive a discharge lamp, the temperature at the tip of each electrode of the discharge lamp increases, which may cause excessive evaporation of the electrode material.

Further, it is a known fact that when the method described in JP-T-10-501919 is used to drive a discharge lamp, a protrusion at the tip of each electrode, which is the discharge start point, grows. In this case, the arc length decreases, and the discharge lamp driving voltage decreases accordingly. Since a discharge lamp is driven at constant power in many cases, decrease in the discharge lamp driving voltage may excessively increase the current flowing through a discharge lamp lighting apparatus.

SUMMARY

An advantage of some aspects of the invention is to provide a discharge lamp lighting apparatus that suppresses decrease in discharge lamp driving voltage and suppresses flickering at the same time. Other advantages of some aspects of the invention are to provide a method for controlling the discharge lamp lighting apparatus, and a projector.

A first aspect of the invention is directed to a discharge lamp lighting apparatus including a power control circuit that outputs a DC current, an AC conversion circuit to which the DC current is inputted, the AC conversion circuit repeatedly reversing the polarity of the DC current between a first polarity and a second polarity at predetermined timings to produce and output a discharge lamp driving AC current, and a controller that controls the AC conversion circuit to perform AC conversion control in which the timings at which the polarity of the discharge lamp driving AC current is reversed are controlled and controls the power control circuit to perform section current control in which the magnitude of the DC current is controlled in each polarity reverse timing section. In the section current control, the magnitude of the DC current is controlled in accordance with a periodic pattern in each of the polarity reverse timing sections to control the ratio of accumulated energy supplied to each electrode of the discharge lamp in the first half of the polarity reverse timing section to that in the second half of the polarity reverse timing section.

According to the first aspect of the invention, changing the ratio of accumulated energy supplied to each electrode of the discharge lamp in the first half of a polarity reverse timing section to that in the second half of the polarity reverse timing section in accordance with a periodic pattern can suppress decrease in the discharge lamp driving voltage and suppress flickering.

The accumulated energy is the energy that corresponds to the amount of power supplied from the discharge lamp lighting apparatus in the period during which either of the electrodes of the discharge lamp acts as the anode.

In the section current control in the discharge lamp lighting apparatus, the magnitude of the DC current may be controlled in each of the polarity reverse timing sections in accordance with the periodic pattern in which the accumulated energy ratio is changed in such a way that the accumulated energy supplied to each electrode in the second half of the polarity reverse timing section is greater than or equal to the accumulated energy supplied to each electrode in the first half of the polarity reverse timing section.

In the discharge lamp lighting apparatus, the controller may perform the section current control in such a way that the magnitude of the DC current is monotonously increased in the polarity reverse timing sections.

In the discharge lamp lighting apparatus, the periodic pattern may include a plurality of segmented periods during each of which the accumulated energy ratio is maintained at the same value, and the accumulated energy ratios in at least two of the segmented periods may differ from each other.

In the discharge lamp lighting apparatus, the controller may perform the section current control in such a way that the average of the DC current in each of the polarity reverse timing sections is controlled to be a fixed value.

A second aspect of the invention is directed to a method for controlling a discharge lamp lighting apparatus including a power control circuit that outputs a DC current, and an AC conversion circuit to which the DC current is inputted, the AC conversion circuit reversing the polarity of the DC current at predetermined timings to produce and output a discharge lamp driving AC current. The method includes controlling the AC conversion circuit to perform AC conversion control in which the timings at which the polarity of the discharge lamp driving AC current is reversed are controlled, and controlling the power control circuit to perform section current control in which the magnitude of the DC current is controlled in each polarity reverse timing section. In the section current control, the magnitude of the DC current is controlled in accordance with a periodic pattern in each of the polarity reverse timing sections to control the ratio of accumulated energy supplied to each electrode of the discharge lamp in the first half of the polarity reverse timing section to that in the second half of the polarity reverse timing section.

A third aspect of the invention is directed to a projector including any of the discharge lamp lighting apparatuses described above.

BRIEF DESCRIPTION OF THE DRAWINGS

The invention will now be described with reference to the accompanying drawings, wherein like numbers reference like elements.

FIGS. 7A and 7B explain an example of control of a discharge lamp lighting apparatus according to an embodiment of the invention.

FIGS. 8A and 8B explain an example of control of a discharge lamp lighting apparatus according to an embodiment of the invention.

FIGS. 10A and 10B explain an example of control of a discharge lamp lighting apparatus according to an embodiment of the invention.

DESCRIPTION OF EXEMPLARY EMBODIMENTS

A preferred embodiment of the invention will be described below in detail with reference to the drawings. It is noted that the embodiment to be described below does not unduly limit the scope of the invention set forth in the claims. Further, all the configurations to be described below are not necessarily the requirements of the invention.

1. Optical System of Projector

Figure 1:
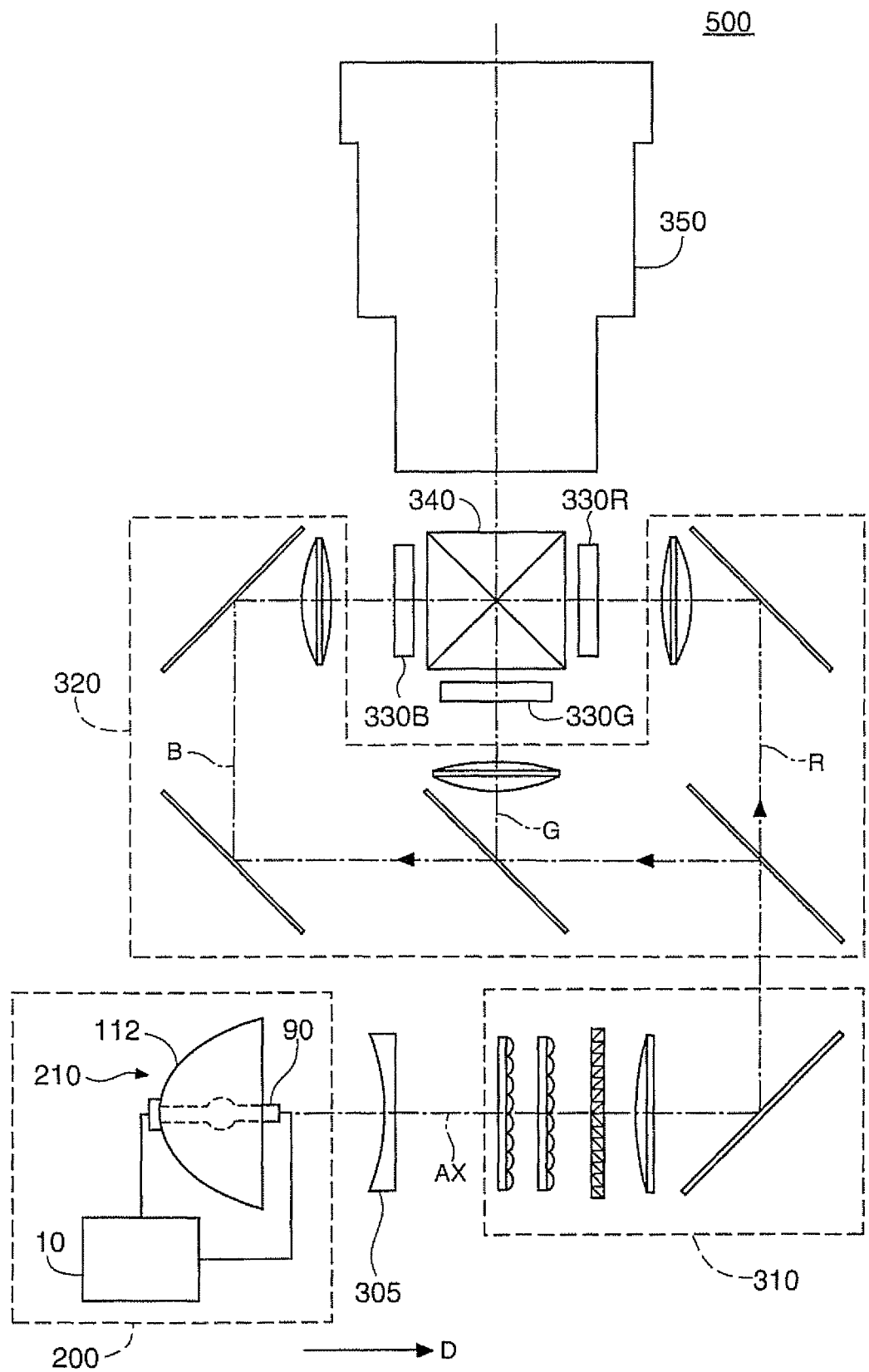
FIG. 1 explains an optical system of a projector according to an embodiment of the invention.

FIG. 1 is a descriptive diagram showing a projector 500 as an embodiment of the invention. The projector 500 includes a light source 200, a parallelizing lens 305, an illumination system 310, a color separation system 320, three liquid crystal light valves 330R, 330G, and 330 B, a cross dichroic prism 340, and a projection system 350.

The light source 200 includes a light source unit 210 and a discharge lamp lighting apparatus 10. The light source unit 210 includes a primary reflection mirror 112 and a discharge lamp 90. The discharge lamp lighting apparatus 10 supplies power to the discharge lamp 90 to turn on the discharge lamp 90. The primary reflection mirror 112 reflects the light emitted from the discharge lamp 90 in the illumination direction D. The illumination direction D is parallel to an optical axis AX. The light from the light source unit 210 passes through the parallelizing lens 305 and enters the illumination system 310. The parallelizing lens 305 parallelizes the light from the light source unit 210.

The illumination system 310 makes the illuminance of the light from the light source 200 uniform in the liquid crystal light valves 330R, 330G, and 330 B. The illumination system 310 aligns the polarization directions of the light beams from the light source 200 in order to effectively use the light from the light source 200 in the liquid crystal light valves 330R, 330G, and 330 B. The light adjusted in terms of the illuminance distribution and the polarization direction enters the color separation system 320. The color separation system 320 separates the incident light into three, red (R), green (G), and blue (B), color light beams. The three color light beams are modulated by the liquid crystal light valves 330R, 330G, and 330 B, which are related to the respective colors. The liquid crystal light valves 330R, 330G, and 330 B include liquid crystal panels 560R, 560G, and 560B and polarizers disposed on the light incident side and light exiting side of the liquid crystal panels 560R, 560G, and 560B. The three modulated color light beams are combined in the cross dichroic prism 340. The combined light enters the projection system 350. The projection system 350 projects the incident light on a screen (not shown). An image is thus displayed on the screen.

A variety of known configurations can be applied to the parallelizing lens 305, the illumination system 310, the color separation system 320, the cross dichroic prism 340, and the projection system 350.

Figure 2:
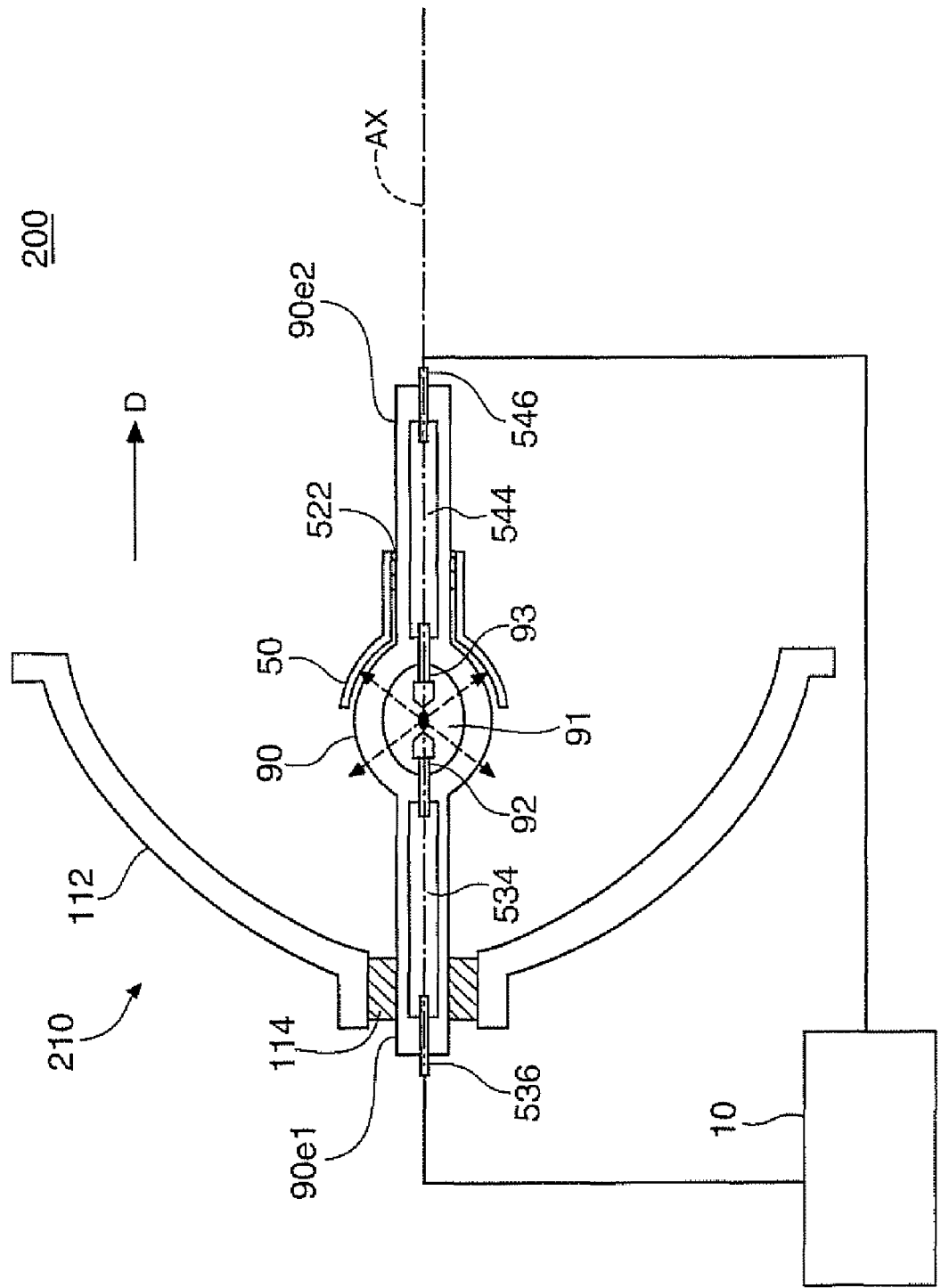
FIG. 2 explains an optical system of a projector according to an embodiment of the invention.

FIG. 2 is a descriptive diagram showing the configuration of the light source 200. The light source 200 includes the light source unit 210 and the discharge lamp lighting apparatus 10. FIG. 2 shows a cross-sectional view of the light source unit 210. The light source unit 210 includes the primary reflection mirror 112, the discharge lamp 90, and a secondary reflection mirror 50.

The discharge lamp 90 has a rod shape extending from a first end 90e1 to a second end 90e2 along the illumination direction D. The discharge lamp 90 is made of quartz glass or any other suitable light-transmissive material. The central portion of the discharge lamp 90 is spherically convex, where a discharge space 91 is formed. The discharge space 91 encapsulates gas, which is a discharge medium containing a rare gas, a metallic halide compound, and other materials.

Two electrodes 92 and 93 protrude into the discharge space 91. The first electrode 92 is disposed on the first end 90e1 side in the discharge space 91, whereas the second electrode 93 is disposed on the second end 90e2 side in the discharge space 91. Each of the electrodes 92 and 93 has a rod shape extending along the optical axis AX. Electrode tips (also called "discharge ends") of the electrodes 92 and 93 face each other in the discharge space 91 and are spaced apart by a predetermined distance. The electrodes 92 and 93 are made of tungsten or any other suitable metal.

A first terminal 536 is provided at the first end 90e1 of the discharge lamp 90. The first terminal 536 is electrically connected to the first electrode 92 via a conductive member 534 that passes inside the discharge lamp 90. Similarly, a second terminal 546 is provided at the second end 90e2 of the discharge lamp 90. The second terminal 546 is electrically connected to the second electrode 93 via a conductive member 544 that passes inside the discharge lamp 90. Each of the terminals 536 and 546 is made of tungsten or any other suitable metal. Each of the conductive members 534 and 544 is formed of, for example, a molybdenum foil.

The terminals 536 and 546 are connected to the discharge lamp lighting apparatus 10. The discharge lamp lighting apparatus 10 supplies an AC current to the terminals 536 and 546. As a result, arc discharge occurs between the two electrodes 92 and 93. The light produced by the arc discharge (discharged light) is radiated from the discharge position in every direction, as indicated by the broken-line arrows.

The primary reflection mirror 112 is fixed with a fixing member 114 to the first end 90e1 of the discharge lamp 90. The reflection surface of the primary reflection mirror 112 (the surface facing the discharge lamp 90) has a spheroidal shape. The primary reflection mirror 112 reflects the discharged light in the illumination direction D. The primary reflection mirror 112 does not necessarily have a spheroidal shape but can have a variety of shapes that reflect the discharged light in the illumination direction D. For example, a paraboloidal shape may be used. In this case, the primary reflection mirror 112 can convert the discharged light into light substantially parallel to the optical axis AX. The parallelizing lens 305 can therefore be omitted.

The secondary reflection mirror 50 is fixed with a fixing member 522 on the second end 90e2 side of the discharge lamp 90. The reflection surface (the surface facing the discharge lamp 90) of the secondary reflection mirror 50 has a spherical shape that surrounds the second end 90e2 side of the discharge space 91. The secondary reflection mirror 50 reflects the discharged light toward the primary reflection mirror 112. The above configuration allows the light radiated from the discharge space 91 to be more efficiently used.

The fixing members 114 and 522 can be made of an arbitrary heat-resistant material (an inorganic adhesive, for example) that withstands the heat produced in the discharge lamp 90. As a method for securely arranging the primary reflection mirror 112 and the secondary reflection mirror 50 with respect to the discharge lamp 90, the primary reflection mirror 112 and the secondary reflection mirror 50 are not necessarily fixed to the discharge lamp 90, but an arbitrary method can be employed. For example, the discharge lamp 90 and the primary reflection mirror 112 may be independently fixed to an enclosure (not shown) of the projector. The same argument applies to the secondary reflection mirror 50.

Figure 3:
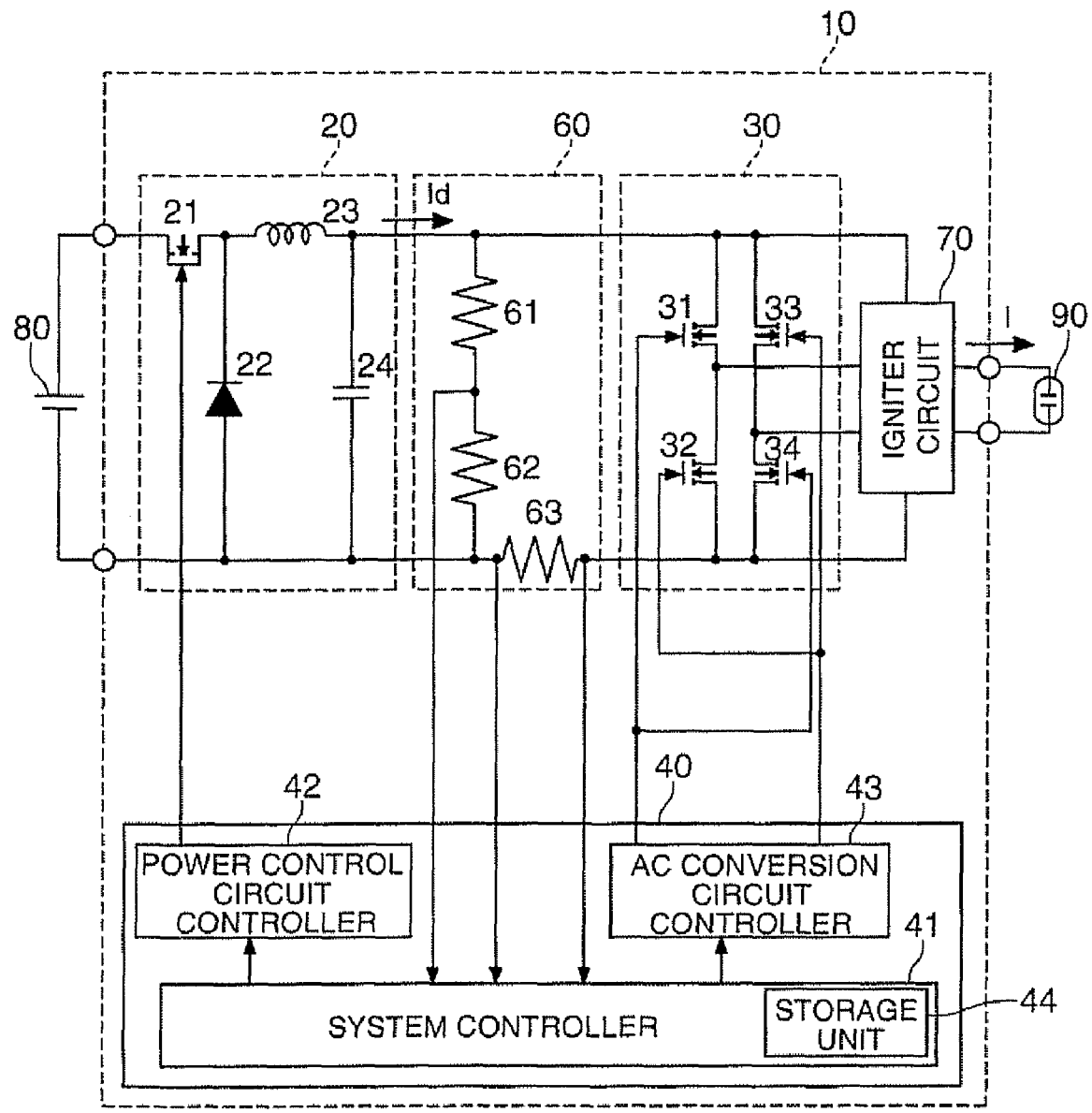
FIG. 3 explains an exemplary circuit configuration of a discharge lamp lighting apparatus according to an embodiment of the invention.

2. Discharge Lamp Lighting Apparatus (1) Example of Circuit Configuration of Discharge Lamp Lighting Apparatus FIG. 3 is an example of the circuit diagram of the discharge lamp lighting apparatus according to the present embodiment.

The discharge lamp lighting apparatus 10 includes a power control circuit 20. The power control circuit 20 controls driving power supplied to the discharge lamp 90. In the present embodiment, the power control circuit 20 is comprised of a down chopper circuit that uses a DC power supply 80 as an input source, lowers the input voltage, and outputs a DC current Id.

The power control circuit 20 may include a switching device 21, a diode 22, a coil 23, and a capacitor 24. The switching device 21 may be comprised of a transistor, for example. In the present embodiment, one end of the switching device 21 is connected to the positive voltage side of the DC power supply 80, and the other end is connected to the cathode terminal of the diode 22 and one end of the coil 23. The other end of the coil 23 is connected to one end of the capacitor 24, and the other end of the capacitor 24 is connected to the anode terminal of the diode 22 and the negative voltage side of the DC power supply 80. A current control signal is inputted from a controller 40 to a control terminal of the switching device 21 to control ON and OFF of the switching device 21. The current control signal may be a PWM control signal, for example.

When the switching device 21 is turned on, a current flows through the coil 23, and energy is stored in the coil 23. When the switching device 21 is then turned off, the energy stored in the coil 23 is discharged through a path passing through the capacitor 24 and the diode 22. This produces the DC current Id proportional to the period during which the switching device 21 is kept ON.

The discharge lamp lighting apparatus 10 further includes an AC current conversion circuit 30. The AC conversion circuit 30 receives as an input the DC current Id outputted from the power control circuit 20, and reverses the polarity of the DC current Id at predetermined timings to produce and output a discharge lamp driving current having an arbitrary frequency and duty ratio. In a discharge lamp driving AC current I whose polarity is switched between a first polarity and a second polarity, the duty ratio is defined as the proportion of the period of the first polarity to one cycle of the discharge lamp driving AC current I. In the present embodiment, the AC conversion circuit 30 is comprised of an inverter bridge circuit (full-bridge circuit).

The AC conversion circuit 30 includes, for example, first to fourth switching devices 31 to 34, such as transistors, and the first and second switching devices 31, 32 connected in series are connected in parallel to the third and fourth switching devices 33, 34 connected in series. Frequency control signals are inputted from the controller 40 to control terminals of the first to fourth switching devices 31 to 34 to control ON and OFF of the first to fourth switching devices 31 to 34.

The AC conversion circuit 30 alternately reverses the polarity of the DC current Id outputted from the power control circuit 20 by repeatedly turning the first and fourth switching devices 31, 34 and the second and third switching devices 32, 33 alternately on and off so as to produce the discharge lamp driving AC current I having a controlled frequency and duty ratio and output it from a common connection point between the first and second switching devices 31, 32 and a common connection point between the third and fourth switch devices 33, 34.

That is, when the first and fourth switching devices 31, 34 are ON, the second and third switching devices 32, 33 are controlled to be OFF, whereas when the first and fourth switching devices 31, 34 are OFF, the second and third switching devices 32, 33 are controlled to be ON. Therefore, when the first and fourth switching devices 31, 34 are ON, the produced discharge lamp driving AC current I flows from one end of the capacitor 24 through the first switching device 31, the discharge lamp 90, and the fourth switching device 34 in this order. On the other hand, when the second and third switching devices 32, 33 are ON, the produced discharge lamp driving AC current I flows from one end of the capacitor 24 through the third switching device 33, the discharge lamp 90, and the second switching device 32 in this order.

The discharge lamp lighting apparatus 10 further includes the controller 40. The controller 40 controls the power control circuit 20 and the AC conversion circuit 30 to control the magnitude, frequency, duty ratio, and waveform of the discharge lamp driving AC current I. The controller 40 controls the AC conversion circuit 30 to perform AC conversion control, and controls the power control circuit 20 to perform section current control. In the AC conversion control, the timings at which the polarity of the discharge lamp driving AC current I is reversed are used to control the frequency and the duty ratio. In the section current control, the magnitude of the outputted DC current Id is controlled in each polarity reverse timing section. The polarity reverse timing section is the period between polarity reverse timings adjacent to each other along the temporal axis. That is, one cycle of the discharge lamp driving AC current I includes two polarity reverse timing sections.

The configuration of the controller 40 is not limited to a specific one. The controller 40 in the present embodiment includes a system controller 41, a power control circuit controller 42, and an AC conversion circuit controller 43. Part or all of the controller 40 may be comprised of a semiconductor integrated circuit.

The system controller 41 controls the power control circuit controller 42 and the AC conversion circuit controller 43 to control the power control circuit 20 and the AC conversion circuit 30. The system controller 41 may control the power control circuit controller 42 and the AC conversion circuit controller 43 based on the discharge lamp driving voltage and the discharge lamp driving AC current I detected by an operation detector 60, which will be described later, provided in the discharge lamp lighting apparatus 10.

In the present embodiment, the system controller 41 further includes a storage unit 44. The storage unit 44 may be provided independently of the system controller 41.

The system controller 41 may control the power control circuit 20 and the AC conversion circuit 30 based on information stored in the storage unit 44. The storage unit 44 may store, for example, information on the magnitude, frequency, duty ratio, and waveform of the discharge lamp driving AC current I.

The power control circuit controller 42 outputs the current control signal to the power control circuit 20 based on a control signal from the system controller 41 so as to control the power control circuit 20.

The AC conversion circuit controller 43 outputs a reverse control signal to the AC conversion circuit 30 based on a control signal from the system controller 41 so as to control the AC conversion circuit 30.

The discharge lamp lighting apparatus 10 may include the operation detector 60. The operation detector 60 may detect the operation of the discharge lamp 90, for example, the discharge lamp driving voltage and the discharge lamp driving AC current I, and output driving voltage information and driving current information. In the present embodiment, the operation detector 60 includes first to third resistors 61 to 63.

Figure 4A:
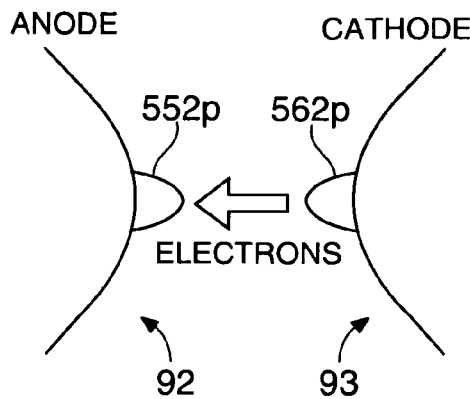
FIGS. 4A to 4D explain an exemplary circuit configuration of a discharge lamp lighting apparatus according to an embodiment of the invention.
Figure 4B:
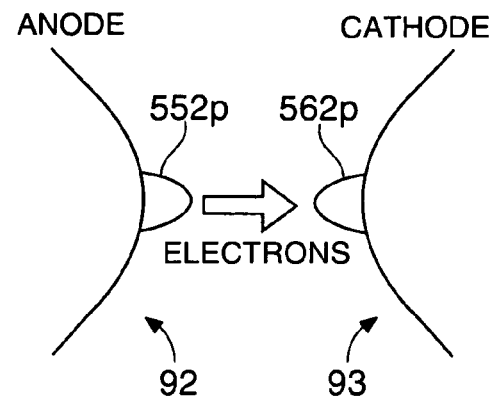

FIGS. 4A to 4D are descriptive diagrams showing the relationship between the polarity of the driving power supplied to the discharge lamp 90 and the temperature of the electrodes. FIGS. 4A and 4B show how the two electrodes 92 and 93 operate. FIGS. 4A and 4B show the tips of the two electrodes 92 and 93. Protrusions 552P and 562P are provided at the tips of the electrodes 92 and 93, respectively. Discharge occurs between the protrusions 552P and 562P. In the present embodiment, the shift of the discharge position (arc position) in each of the electrodes 92 and 93 can be suppressed as compared to a case where no protrusions are provided. It is noted, however, that such protrusions may be omitted. FIG. 4A shows a first polarity state P1 in which the first electrode 92 acts as the anode and the second electrode 93 acts as the cathode. In the first polarity state P1, discharge causes electrons to move from the second electrode 93 (cathode) to the first electrode 92 (anode). The cathode (second electrode 93) discharges electrons. The electrons discharged from the cathode (second electrode 93) impinge on the tip of the anode (first electrode 92). The impingement produces heat, which increases the temperature at the tip (protrusion 552P) of the anode (first electrode 92).

FIG. 4B shows a second polarity state P2 in which the first electrode 92 acts as the cathode and the second electrode 93 acts as the anode. In the second polarity state P2, electrons move from the first electrode 92 to the second electrode 93 in contrast to the first polarity state P1. As a result, the temperature at the tip (protrusion 562P) of the second electrode 93 increases.

As described above, the temperature of the anode readily becomes higher than that of the cathode. When the temperature of one of the electrodes continues to be higher than that of the other electrode, a variety of problems may occur. For example, when the tip of the hot-side electrode melts excessively, the electrode may suffer from an unexpected deformation. As a result, the arc length may deviate from an adequate value. When the tip of the cold-side electrode melts insufficiently, tiny irregularities produced at the tip may not melt but remain. As a result, what is called an arc jump may occur (the arc position is not stable but moved).

Figure 4C:
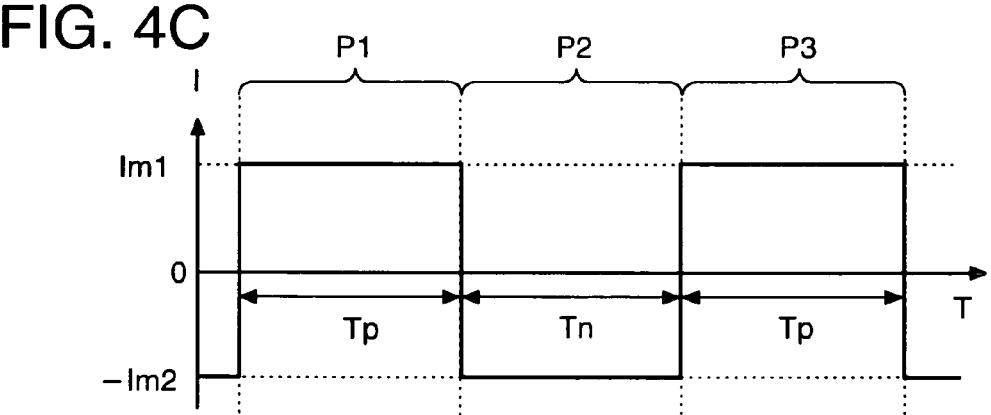

To prevent such a problem, it is possible to use AC driving in which the polarities of the electrodes are repeatedly switched. FIG. 4C is a timing chart showing AC power (drive signal) supplied to the discharge lamp 90 (FIG. 2). The horizontal axis represents the time T, and the vertical axis represents the current I. The current I represents the current flowing through the discharge lamp 90. Positive values represent the first polarity state P1, whereas negative values represent the second polarity state P2. In the example shown in FIG. 4C, a rectangular-wave AC current is used, and the first polarity state P1 and the second polarity state P2 are alternately repeated. A first polarity section Tp represents a period during which the first polarity state P1 continues, and a second polarity section Tn is a period during which the second polarity state P2 continues. The average current magnitude in the first polarity section Tp is +A0, and the average current magnitude in the second polarity section Tn is −A0. The drive frequency can be experimentally determined in accordance with the characteristics of the discharge lamp 90 (a value within a range from 30 Hz to 1 KHz is used, for example). The other values +A0, −A0, Tp, and Tn can be experimentally determined as well.

Figure 4D:
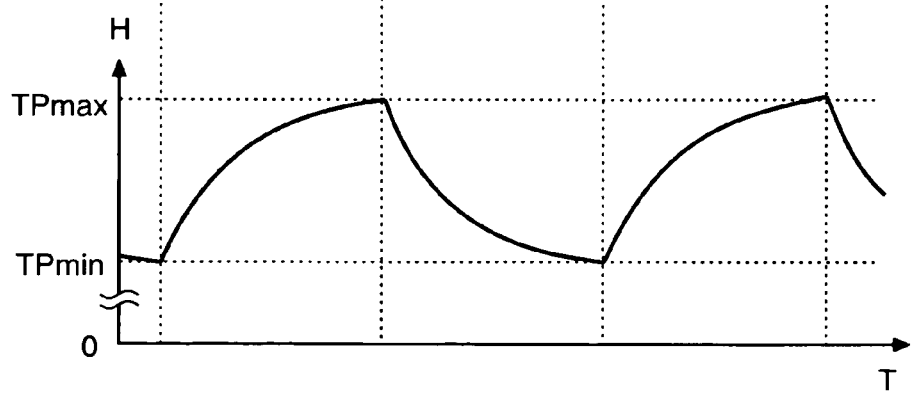

FIG. 4D is a timing chart showing the change in the temperature of the first electrode 92. The horizontal axis represents the time T, and the vertical axis represents the temperature H. In the first polarity state P1, the temperature H of the first electrode 92 increases, whereas in the second polarity state P2, the temperature H of the first electrode 92 decreases. Since the first polarity state P1 and the second polarity state P2 are alternately repeated, the temperature H periodically changes between a minimum value Hmin and a maximum value Hmax. Although not illustrated, the temperature of the second electrode 93 changes in opposite phase to the temperature H of the first electrode 92. That is, the temperature of the second electrode 93 decreases in the first polarity state P1, whereas the temperature of the second electrode 93 increases in the second polarity state P2.

In the first polarity state P1, since the tip of the first electrode 92 (protrusion 552P) melts, the tip of the first electrode 92 (protrusion 552P) becomes smooth. The discharge position in the first electrode 92 will not therefore be shifted. On the other hand, since the temperature at the tip of the second electrode 93 (protrusion 562P) decreases, the second electrode 93 (protrusion 562P) will not melt excessively. No unexpected electrode deformation will therefore occur. In the second polarity state P2, the behaviors of the first electrode 92 and the second electrode 93 are reversed. The problems with the two electrodes 92 and 93 can therefore be eliminated by repeating the two states P1 and P2.

When the waveform of the current I is symmetric, that is, when the waveform of the current I satisfies the conditions "|+A0|=|−A0|, Tp=Tn," the conditions of the power supplied to the two electrodes 92 and 93 are the same. The difference in temperature between the two electrodes 92 and 93 is therefore expected to be small. However, when such symmetric current waveform-based driving continues, steady convection occurs in the discharge space 91, and the electrode material is deposited or precipitated locally on the shafts of the electrodes and grows into needle-like projections, possibly leading to unexpected discharge toward the wall of the light-transmissive material that surrounds the discharge space 91. Such unexpected discharge causes degradation of the inner wall and reduction in life of the discharge lamp 90. Further, when such symmetric current waveform-based driving continues, the electrodes are maintained in a fixed temperature distribution for a long time. In this case, the asymmetry of the electrodes resulting from the change in state over time is enhanced with time.

The operation detector 60 detects the discharge lamp driving voltage by using the voltages divided by the first and second resistors 61, 62 connected in parallel to the discharge lamp 90 and connected in series to each other, and detects the discharge lamp driving AC current I by using the voltage produced in the third resistor 63 connected in series to the discharge lamp 90.

The discharge lamp lighting apparatus 10 may include an igniter circuit 70. The igniter circuit 70 operates only when the discharge lamp 90 is turned on, and supplies a high voltage (a voltage higher than that in a typical control operation) between the electrodes of the discharge lamp 90, the high voltage required to cause dielectric breakdown between the electrodes of the discharge lamp 90 to form a discharge path when the discharge lamp 90 is turned on. In the present embodiment, the igniter circuit 70 is connected in parallel to the discharge lamp 90.

(2) Example of Control of Discharge Lamp Lighting Apparatus

A description will be made of a specific example of control of the discharge lamp lighting apparatus 10 according to the present embodiment.

In the section current control performed by the controller 40 in the discharge lamp lighting apparatus 10 according to the present embodiment, the magnitude of the DC current Id outputted from the power control circuit 20 is controlled in each polarity reverse timing section in accordance with a periodic pattern so as to control the ratio of accumulated energy supplied to the electrodes of the discharge lamp in the first half of a polarity reverse timing section to that in the second half of the polarity reverse timing section.

Figure 5:
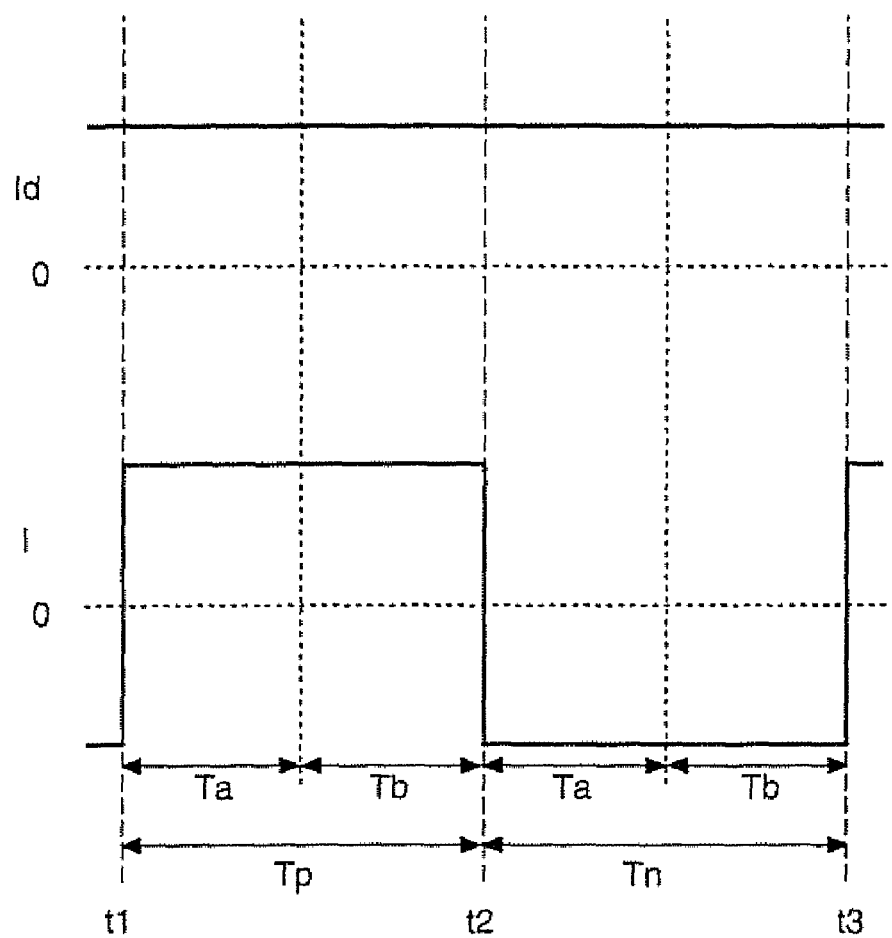
FIG. 5 explains an example of control of a discharge lamp lighting apparatus according to an embodiment of the invention.

FIG. 5 shows an example of the waveform of the DC current Id outputted from the power control circuit 20 and the waveform of the discharge lamp driving AC current I. The horizontal axis represents time, and the vertical axis represents current magnitude. The time stamps t1, t2, and t3 represent the timings where the polarity of the discharge lamp driving AC current I is reversed. The first polarity section Tp is a polarity reverse timing section in which the discharge lamp driving AC current I has the first polarity (the first electrode 92 acts as the anode), and the second polarity section Tn is a polarity reverse timing section in which the discharge lamp driving AC current I has the second polarity (the first electrode 92 acts as the cathode). The first polarity section Tp and the second polarity section Tn combines to form one cycle of the AC current I. That is, a polarity reverse timing section has the first polarity section Tp and the second polarity section Tn. Each of the sections Tp and Tn has a first half section Ta and a second half section Tb.

The ratio R of accumulated energy supplied to the electrodes 92 and 93 of the discharge lamp 90 in the first half of a single polarity reverse timing section to that in the second half of the polarity reverse timing section is expressed by the following equation.

$$R = (\text{Accumulated energy supplied to the electrodes in the second half section } Tb)/(\text{Accumulated energy supplied to the electrodes in the first half section } Ta)$$

The accumulated energy is the energy that corresponds to the amount of power supplied from the discharge lamp lighting apparatus in the period during which either of the electrodes 92 and 93 of the discharge lamp 90 acts as the anode. When the discharge lamp 90 is stably driven, the driving voltage is substantially fixed for a short period of time, and the length of the first half section Ta is equal to that of the second half section Tb. The above equation can therefore be approximated as follows $$R \approx (\text{Discharge lamp driving AC current I supplied to the electrodes in the second half section } Tb)/(\text{Discharge lamp driving AC current I supplied to the electrodes in the first half section } Ta)$$

Further, since the discharge lamp driving AC current I is generated by reversing the polarity of the DC current Id outputted from the power control circuit 20, the above equation can be approximated as follows.

$$R \approx (\text{DC current Id in the second half section } Tb)/(\text{DC current Id in the first half section } Ta)$$

The accumulated energy ratio R can therefore be controlled by controlling the DC current Id outputted from the power control circuit 20.

In the example shown in FIG. 5, the controller 40 performs the section current control in such a way that the DC current Id outputted from the power control circuit 20 is fixed in each of the first polarity section Tp and the second polarity section Tn. That is, the section current control is performed in such a way that the ratio R of the accumulated energy supplied to the electrodes 92 and 93 of the discharge lamp 90 in the first half section Ta of a polarity reverse timing section (each of the first polarity section Tp and the second polarity section Tn) to that in the second half section Tb of the polarity reverse timing section is 1.

Figure 6A:
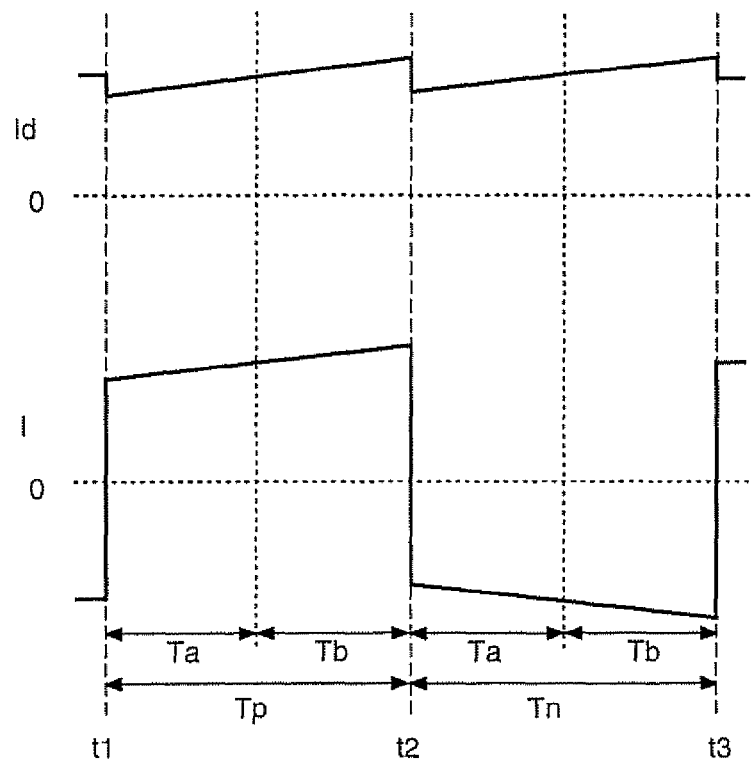
FIGS. 6A and 6B explain an example of control of a discharge lamp lighting apparatus according to an embodiment of the invention.
Figure 6B:
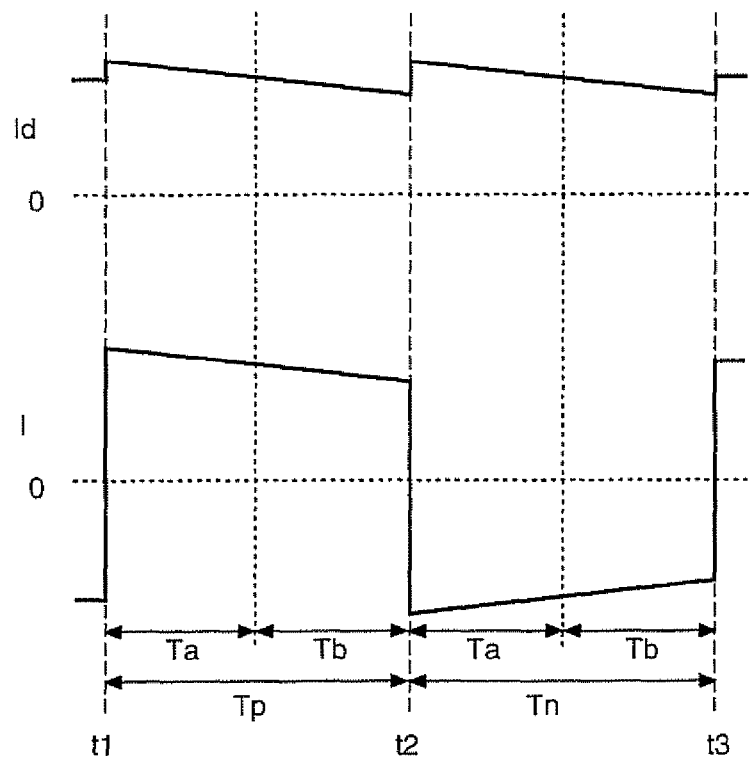

FIGS. 6A and 6B show other examples of the waveform of the DC current Id outputted from the power control circuit 20 and the waveform of the discharge lamp driving AC current I. The horizontal axis represents time, and the vertical axis represents current magnitude.

FIG. 6A shows an example of the way the controller 40 performs section current control in which the magnitude of the DC current Id outputted from the power control circuit 20 is linearly and monotonously increased in each polarity reverse timing section. In the example shown in FIG. 6A, the section current control is performed in such a way that the accumulated energy ratio R is 1.15, which is greater than 1 in the example shown in FIG. 5.

FIG. 6B shows an example of the way the controller 40 performs section current control in which the magnitude of the DC current Id outputted from the power control circuit 20 is linearly and monotonously decreased in each polarity reverse timing section. In the example shown in FIG. 6B, the section current control is performed in such a way that the accumulated energy ratio R is 0.87, which is smaller than 1 in the example shown in FIG. 5.

FIG. 7A shows an example of the periodic pattern in accordance with which the accumulated energy ratio R is changed. The horizontal axis represents time, and the vertical axis represents the accumulated energy ratio R.

The periodic pattern shown in FIG. 7A in accordance with which the accumulated energy ratio R is changed is a pattern in which the accumulated energy ratio R is continuously increased and decreased from a central value of 1 repeatedly in accordance with a sinusoidal curve. FIG. 7A shows one cycle of the periodic pattern. The maximum and minimum values of the accumulated energy ratio R may be arbitrarily set, for example, within a range from 0.5 to 2.0 inclusive.

FIG. 7B shows an example of the waveform of the discharge lamp driving AC current I that corresponds to FIG. 7A. The horizontal axis represents time, and the vertical axis represents the magnitude of the discharge lamp driving AC current I.

In the example shown in FIG. 7B, the accumulated energy ratio R is determined based on the periodic pattern shown in FIG. 7A at the timing at which the anode of the discharge lamp is switched from the second electrode 93 to the first electrode 92, and then one cycle of the discharge lamp driving AC current I is generated.

In the present embodiment, when the accumulated energy ratio R is 1, the controller 40 performs the section current control in such a way that the DC current Id outputted from the power control circuit 20 is fixed in each polarity reverse timing section.

When the accumulated energy ratio R is greater than 1, the controller 40 performs the section current control in such a way that the magnitude of the DC current Id outputted from the power control circuit 20 is linearly and monotonously increased in each polarity reverse timing section.

When the accumulated energy ratio R is smaller than 1, the controller 40 performs the section current control in such a way that the magnitude of the DC current Id outputted from the power control circuit 20 is linearly and monotonously decreased in each polarity reverse timing section.

In the driving operation of the discharge lamp 90, in general, when the accumulated energy supplied to the electrodes in the second half section Tb is greater than the accumulated energy supplied to the electrodes in the first half section Ta, the temperature at the tip of each of the electrodes relatively increases and the amount of the melted electrodes increases accordingly. In contrast, when the accumulated energy supplied to the electrodes in the second half section Tb is smaller than the accumulated energy supplied to the electrodes in the first half section Ta, the temperature at the tip of each of the electrodes relatively decreases and the amount of the melted electrodes decreases accordingly.

Causing the electrodes 92 and 93 of the discharge lamp 90 to periodically undergo the effect described above can suppress excessive increase in the temperature at the tip of each of the electrodes of the discharge lamp 90 and suppress abnormal growth of the protrusion at the tip of each of the electrodes, which is the discharge start point. The arc length can therefore be maintained, which can suppress decrease in the voltage for driving the discharge lamp 90.

Further, setting the accumulated energy supplied to the electrodes in the second half section Tb to a level greater than the accumulated energy supplied to the electrodes in the first half section Ta increases the temperature at the tip of each of the electrodes. The small protrusion on each of the electrodes, which causes flickering, therefore melts, which can suppress the flickering.

Therefore, changing the ratio of the accumulated energy supplied to the electrodes of the discharge lamp in the first half of a polarity reverse timing section to that in the second half of the polarity reverse timing section in accordance with the periodic pattern can suppress decrease in the discharge lamp driving voltage and suppress flickering.

First Variation

While in the embodiment described above, the controller 40 performs the section current control in accordance with the periodic pattern in which the accumulated energy ratio R is continuously increased and decreased from a central value of 1 repeatedly based on a sinusoidal curve, the section current control may be performed in such a way that the magnitude of the DC current Id outputted from the power control circuit 20 may be controlled in each polarity reverse timing section in accordance with a periodic pattern in which the accumulated energy ratio R is changed in such a way that the accumulated energy supplied to the electrodes 92 and 93 in the second half of the polarity reverse timing section is greater than or equal to the accumulated energy supplied to the electrodes 92 and 93 in the first half of the polarity reverse timing section. That is, the controller 40 may perform the section current control in such a way that the accumulated energy ratio R is greater than or equal to 1 throughout the periodic pattern.

FIG. 8A shows an example of the periodic pattern in accordance with which the accumulated energy ratio R is changed. The horizontal axis represents time, and the vertical axis represents the accumulated energy ratio R.

The periodic pattern in accordance with which the accumulated energy ratio R is changed shown in FIG. 8A is a pattern in which the accumulated energy ratio R is continuously increased and decreased repeatedly within a range that satisfies the accumulated energy ratio R>1. FIG. 8A shows two cycles of the periodic pattern.

FIG. 8B shows an example of the waveform of the discharge lamp driving AC current I that corresponds to FIG. 8A. The horizontal axis represents time, and the vertical axis represents the magnitude of the discharge lamp driving AC current I.

In the example shown in FIG. 8B, the accumulated energy ratio R is determined based on the periodic pattern shown in FIG. 8A at the timing at which the anode of the discharge lamp is switched from the second electrode 93 to the first electrode 92, and then one cycle of the discharge lamp driving AC current I is generated.

In the present embodiment, when the accumulated energy ratio R is 1, the controller 40 performs the section current control in such a way that the DC current Id outputted from the power control circuit 20 is fixed in each polarity reverse timing section.

When the accumulated energy ratio R is greater than 1, the controller 40 performs the section current control in such a way that the magnitude of the DC current Id outputted from the power control circuit 20 is linearly and monotonously increased in each polarity reverse timing section.

Performing the section current control as described above in such a way that the magnitude of the DC current Id outputted from the power control circuit 20 is controlled in accordance with the periodic pattern in which the accumulated energy ratio R is greater than or equal to 1 can suppress excessive increase in the temperature at the tip of each of the electrodes of the discharge lamp 90 and suppress growth of the protrusion at the tip of each of the electrodes, which is the discharge start point. The arc length can therefore be maintained, which can suppress decrease in the voltage for driving the discharge lamp 90.

Further, setting the accumulated energy supplied to the electrodes in the second half section Tb to a level greater than or equal to the accumulated energy supplied to the electrodes in the first half section Ta increases the temperature at the tip of each of the electrodes. The small protrusion on each of the electrodes, which causes flickering, therefore readily melts, which can further suppress the flickering.

Therefore, changing the accumulated energy ratio R in accordance with the periodic pattern in which the accumulated energy supplied to the electrodes 92 and 93 in the second half of a polarity reverse timing section is greater than or equal to the accumulated energy supplied to the electrodes 92 and 93 in the first half of the polarity reverse timing section can suppress decrease in the discharge lamp driving voltage and further suppress flickering.

Second Variation

While in the embodiment described above, the controller 40 performs the section current control in accordance with the periodic pattern in which the accumulated energy ratio R is continuously increased and decreased repeatedly, the periodic pattern may include a plurality of segmented periods during each of which the accumulated energy ratio R is maintained at the same value and the accumulated energy ratios R in at least two of the segmented periods differ from each other.

Figures 9A, 9B:
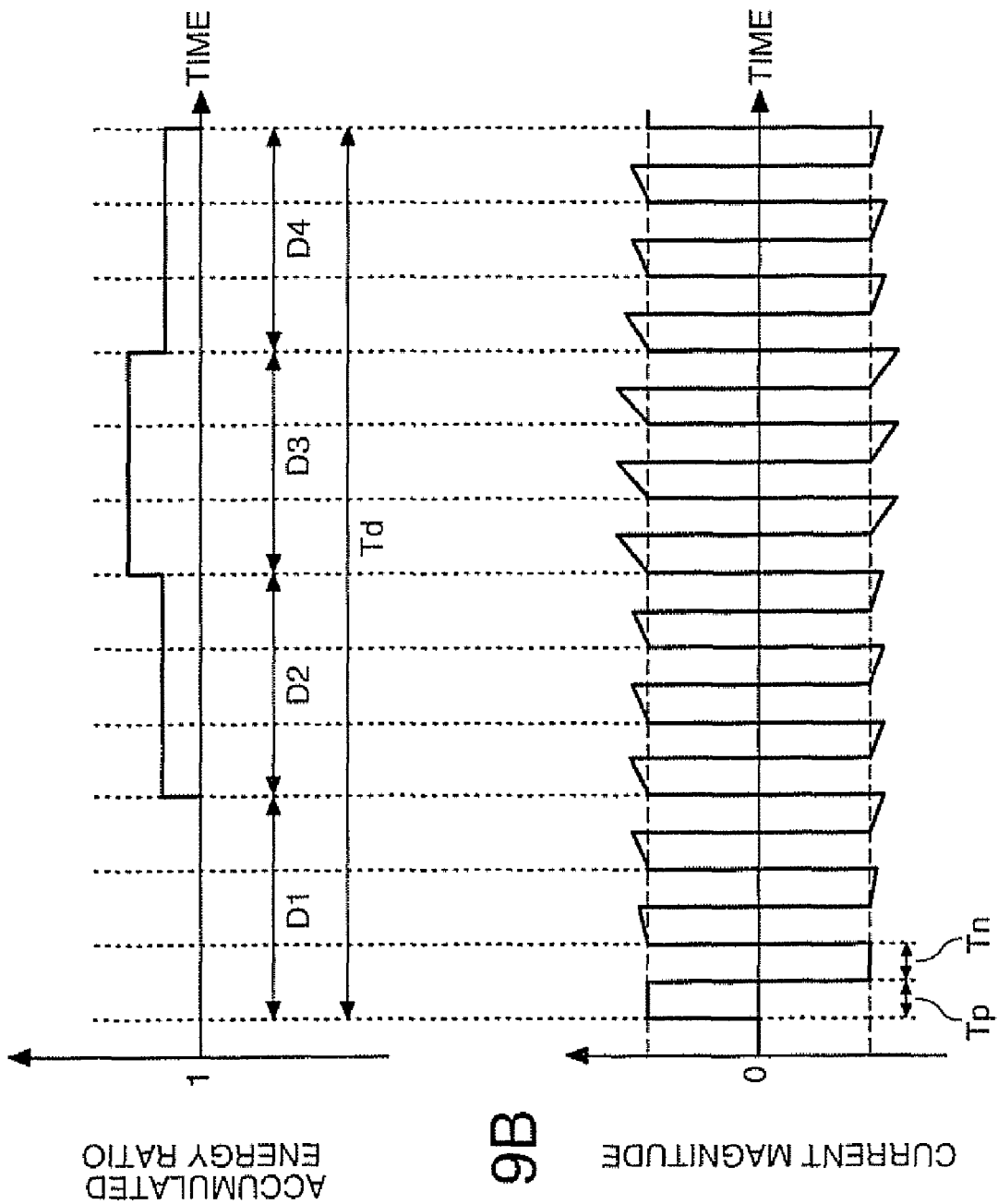
FIGS. 9A and 9B explain an example of control of a discharge lamp lighting apparatus according to an embodiment of the invention.

FIG. 9A shows an example of the periodic pattern in accordance with which the accumulated energy ratio R is changed. The horizontal axis represents time, and the vertical axis represents the accumulated energy ratio R.

The periodic pattern in accordance with which the accumulated energy ratio R is changed shown in FIG. 9A includes four segmented periods (segmented periods D1 to D4) in the period of one cycle Td of the periodic pattern, during each of the segmented periods the accumulated energy ratio R is maintained at the same value within a range that satisfies the accumulated energy ratio $R \geq 1$, and the accumulated energy ratio R is repeatedly incremented and decremented stepwise in the pattern.

That is, any of the segmented periods is a period during which the same section current control continues in terms of one cycle unit of the discharge lamp driving AC current I. The length of each of the segmented periods D1 to D4 can be, for example, 1 second. In the example shown in FIGS. 9A and 9B, the length of each of the segmented periods D1 to D4 is the length that corresponds to three cycles of the discharge lamp driving AC current I.

FIG. 9B shows an example of the waveform of the discharge lamp driving AC current I that corresponds to FIG. 9A. The horizontal axis represents time, and the vertical axis represents the magnitude of the discharge lamp driving AC current I.

In the example shown in FIG. 9B, the accumulated energy ratio R is determined based on the periodic pattern shown in FIG. 9A at the timing at which the anode of the discharge lamp is switched from the second electrode 93 to the first electrode 92, and then one cycle of the discharge lamp driving AC current I is generated.

In the present embodiment, when the accumulated energy ratio R is 1, the controller 40 performs the section current control in such a way that the DC current Id outputted from the power control circuit 20 is fixed in each polarity reverse timing section.

When the accumulated energy ratio R is greater than 1, the controller 40 performs the section current control in such a way that the magnitude of the DC current Id outputted from the power control circuit 20 is linearly and monotonously increased in each polarity reverse timing section.

Performing the section current control as described above in such a way that the magnitude of the DC current Id outputted from the power control circuit 20 is controlled in accordance with the periodic pattern in which the accumulated energy ratio R is greater than or equal to I can suppress excessive increase in the temperature at the tip of each of the electrodes of the discharge lamp 90 and suppress abnormal growth of the protrusion at the tip of each of the electrodes, which is the discharge start point. The arc length can therefore be maintained, which can suppress decrease in the voltage for driving the discharge lamp 90.

Further, setting the accumulated energy supplied to the electrodes in the second half section Tb to a level greater than or equal to the accumulated energy supplied to the electrodes in the first half section Ta increases the temperature at the tip of each of the electrodes. The small protrusion on each of the electrodes, which causes flickering, therefore readily melts.

Moreover, the periodic pattern includes a plurality of segmented periods during each of which the accumulated energy ratio R is maintained at the same valuer and the accumulated energy ratios R in at least two of the segmented periods differ from each other. The thus configured periodic pattern increases the period during which the accumulated energy supplied to the electrodes in the second half section Tb is maintained at a level greater than or equal to the accumulated energy supplied to the electrodes in the first half section Ta.

The temperature at the tip of each of the electrodes thus increases and the small protrusion on each of the electrodes, which causes flickering, readily melts. The flickering can thus be further suppressed.

Therefore, changing the accumulated energy ratio R in accordance with the periodic pattern in which the accumulated energy supplied to the electrodes in the second half of a polarity reverse timing section is greater than or equal to the accumulated energy supplied to the electrodes in the first half of the polarity reverse timing section, in combination with configuring the periodic pattern in such a way that it includes a plurality of segmented periods during each of which the accumulated energy ratio R is maintained at the same value and the accumulated energy ratios R in at least two of the segmented periods differ from each other, can suppress decrease in the discharge lamp driving voltage and further suppress flickering.

Third Variation

While in the embodiment described above, the controller 40 performs section current control in which the minimum value of the DC current Id outputted from the power control circuit 20 is controlled to be a fixed value in each polarity reverse timing section, the controller 40 may perform the section current control in such a way that the average of the DC current Id outputted from the power control circuit 20 is controlled to be a fixed value in each polarity reverse timing section.

FIG. 10A shows an example of the periodic pattern in accordance with which the accumulated energy ratio R is changed. The horizontal axis represents time, and the vertical axis represents the accumulated energy ratio R.

The periodic pattern in accordance with which the accumulated energy ratio R is changed shown in FIG. 10A is a pattern in which the accumulated energy ratio R is continuously increased and decreased repeatedly within a range that satisfies the accumulated energy ratio R>1. FIG. 10A shows two cycle of the periodic pattern.

FIG. 10B shows an example of the waveform of the discharge lamp driving AC current I that corresponds to FIG. 10A. The horizontal axis represents time, and the vertical axis represents the magnitude of the discharge lamp driving AC current I.

In the example shown in FIG. 10B, the accumulated energy ratio R is determined based on the periodic pattern shown in FIG. 10A at the timing at which the anode of the discharge lamp is switched from the second electrode 93 to the first electrode 92, and then one cycle of the discharge lamp driving AC current I is generated.

Further, in the example shown in FIG. 10B, the controller 40 performs the section current control in such a way that the average of the DC current Id outputted from the power control circuit 20 is controlled to be a fixed value in each polarity reverse timing section. That is, even when the accumulated energy ratio R is changed, the average of the discharge lamp driving AC current I is fixed in each polarity reverse timing section.

In the present embodiment, when the accumulated energy ratio R is 1, the controller 40 performs the section current control in such a way that the DC current Id outputted from the power control circuit 20 is fixed in each polarity reverse timing section.

When the accumulated energy ratio R is greater than 1, the controller 40 performs the section current control in such a way that the magnitude of the DC current Id outputted from the power control circuit 20 is linearly and monotonously increased in each polarity reverse timing section.

Performing the section current control as described above in such a way that the average of the DC current Id outputted from the power control circuit 20 is controlled to be a fixed value in each polarity reverse timing section can minimize variation in luminance of the discharge lamp 90.

Therefore, changing the accumulated energy ratio R in accordance with the periodic pattern in which the accumulated energy supplied to the electrodes in the second half section Tb of a polarity reverse timing section is greater than or equal to the accumulated energy supplied to the electrodes in the first half section Ta of the polarity reverse timing section not only can suppress decrease in the discharge lamp driving voltage and suppress flickering, but also can minimize variation in luminance of the discharge lamp.

Fourth Variation

While in the embodiment described above, when the accumulated energy ratio R is greater than 1, the controller 40 performs the section current control in such a way that the magnitude of the DC current Id outputted from the power control circuit 20 is linearly and monotonously increased in each polarity reverse timing section, the section current control may be performed in such a way that the magnitude of the DC current Id outputted from the power control circuit 20 is increased stepwise.

Figure 11A:
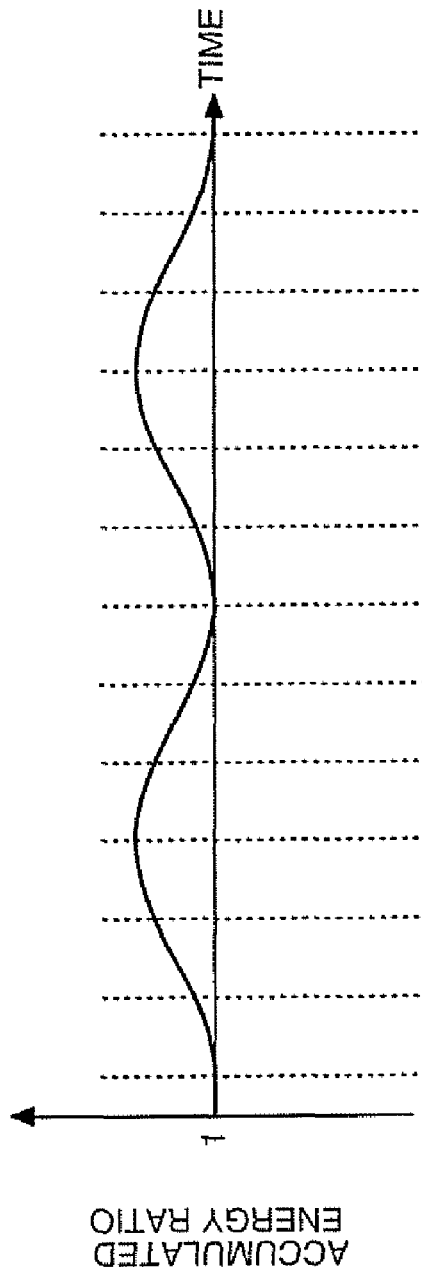
FIGS. 11A and 11B explain an example of control of a discharge lamp lighting apparatus according to an embodiment of the invention.

FIG. 11A shows an example of the periodic pattern in accordance with which the accumulated energy ratio R is changed. The horizontal axis represents time, and the vertical axis represents the accumulated energy ratio R.

The periodic pattern in accordance with which the accumulated energy ratio R is changed shown in FIG. 11A is a pattern in accordance of which the accumulated energy ratio R is continuously increased and decreased repeatedly within a range that satisfies the accumulated energy ratio R≧1. FIG. 11A shows two cycle of the periodic pattern.

Figure 11B:
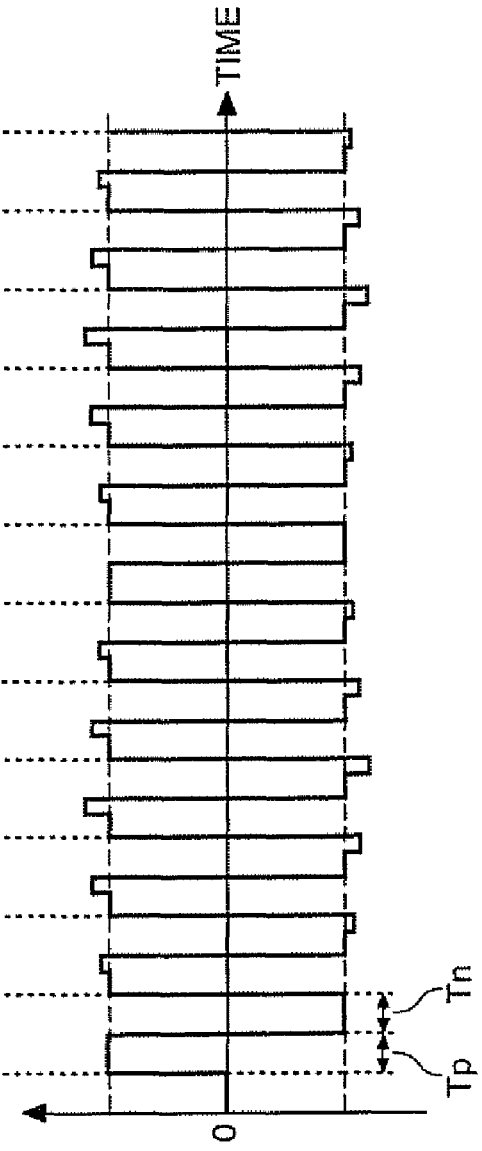

FIG. 11B shows an example of the waveform of the discharge lamp driving AC current I that corresponds to FIG. 11A. The horizontal axis represents time, and the vertical axis represents the magnitude of the discharge lamp driving AC current I.

In the example shown in FIG. 11B, the accumulated energy ratio R is determined based on the periodic pattern shown in FIG. 11A at the timing at which the anode of the discharge lamp is switched from the second electrode 93 to the first electrode 92, and then one cycle of the discharge lamp driving AC current I is generated.

In the present embodiment, when the accumulated energy ratio R is 1, the controller 40 performs the section current control in such a way that the DC current Id outputted from the power control circuit 20 is fixed in each polarity reverse timing section.

When the accumulated energy ratio R is greater than 1, the controller 40 performs the section current control in such a way that the magnitude of the DC current Id outputted from the power control circuit 20 in a first section that corresponds to the first half of a polarity reverse timing section is controlled to be different from that in a second section that corresponds to the second half of the polarity reverse timing section. The current magnitude is fixed in the first section, and the current magnitude is fixed in the second section. The accumulated energy ratio R is changed in accordance with a periodic pattern in which the difference in the current magnitude between the first section and the second section of the same polarity reverse timing section is changed. The section current control is performed in such a way that the accumulated energy ratio R is changed by changing the current magnitude in the second section while maintaining the current magnitude in the first section to a fixed value.

Performing the section current control as described above in such a way that the magnitude of the DC current Id outputted from the power control circuit 20 is incremented and decremented stepwise can also suppress excessive increase in the temperature at the tip of each of the electrodes of the discharge lamp 90 and suppress growth of the protrusion at the tip of each of the electrodes, which is the discharge start point. The arc length can therefore be maintained, which can suppress decrease in the voltage for driving the discharge lamp 90.

Further, in the section current control in the present embodiment as well, setting the accumulated energy supplied to the electrodes in the second half section Tb to a level greater than or equal to the accumulated energy supplied to the electrodes in the first half section Ta increases the temperature at the tip of each of the electrodes. The small protrusion on each of the electrodes, which causes flickering, therefore readily melts, whereby the flickering can be further suppressed.

Therefore, changing the accumulated energy ratio R in accordance with the periodic pattern in which the accumulated energy supplied to the electrodes 92 and 93 in the second half section Tb of a polarity reverse timing section is greater than or equal to the accumulated energy supplied to the electrodes 92 and 93 in the first half section Ta of the polarity reverse timing section can suppress decrease in the discharge lamp driving voltage and further suppress flickering.

Figure 12A:
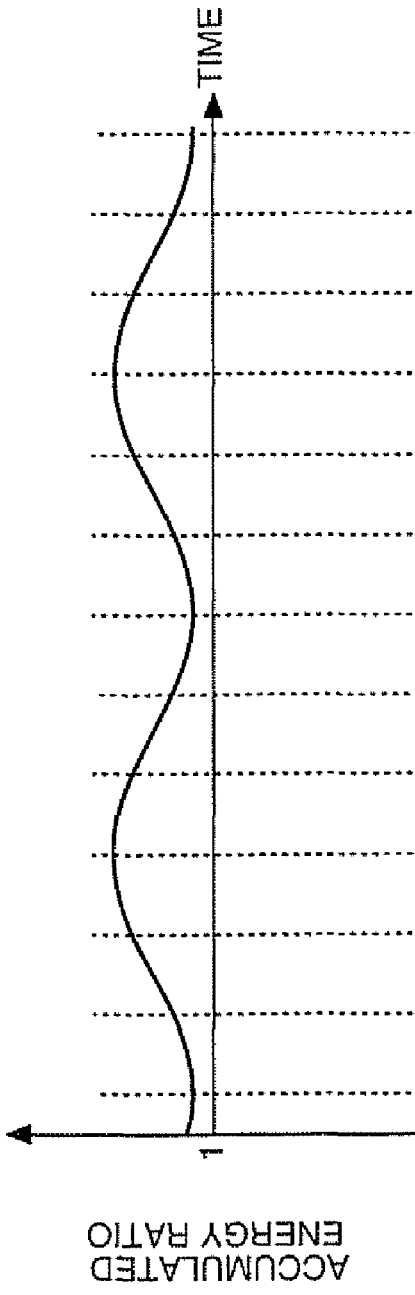
FIGS. 12A and 12B explain an example of control of a discharge lamp lighting apparatus according to an embodiment of the invention.
Figure 12B:
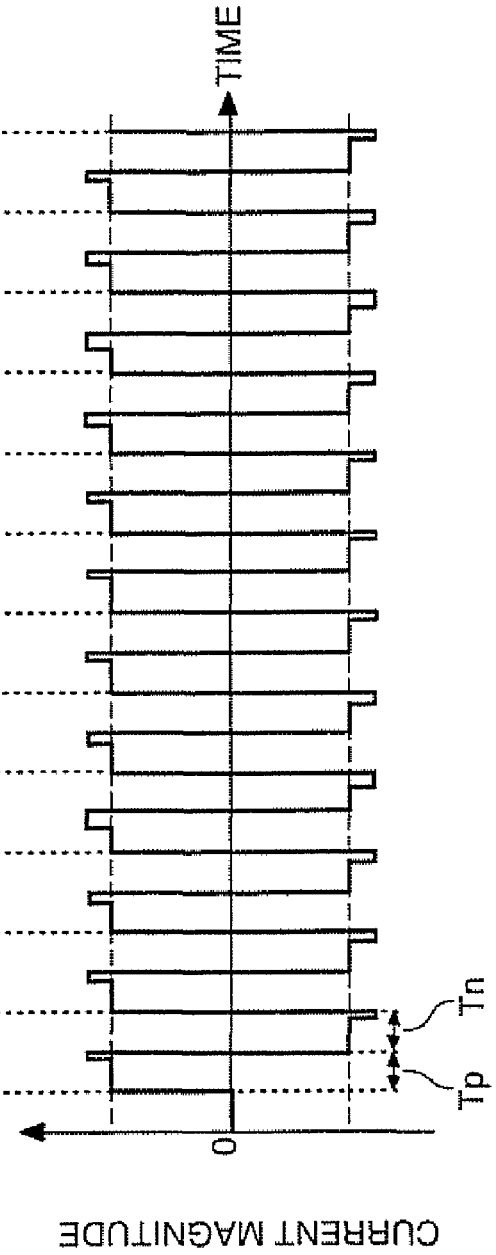

As seen in the example shown in FIGS. 12A and 12B, the section current control can also be performed in such a way that the accumulated energy ratio R is changed by changing the length of the second section instead of the current magnitude in the second section.

Further, any of the variations described above can be combined with the section current control in which the average of the DC current Id outputted from the power control circuit 20 is controlled to be a fixed value.

Performing the section current control as described above in such a way that the average of the DC current Id outputted from the power control circuit 20 is controlled to be a fixed value in each polarity reverse timing section can minimize variation in luminance of the discharge lamp 90.

Therefore, changing the accumulated energy ratio R in accordance with the periodic pattern in which the accumulated energy supplied to the electrodes 92 and 93 in the second half section Tb of a polarity reverse timing section is greater than or equal to the accumulated energy supplied to the electrodes 92 and 93 in the first half section Ta of the polarity reverse timing section not only can suppress decrease in the discharge lamp driving voltage and suppress flickering, but also can minimize variation in luminance of the discharge lamp.

3. Circuit Configuration of Projector

Figure 13:
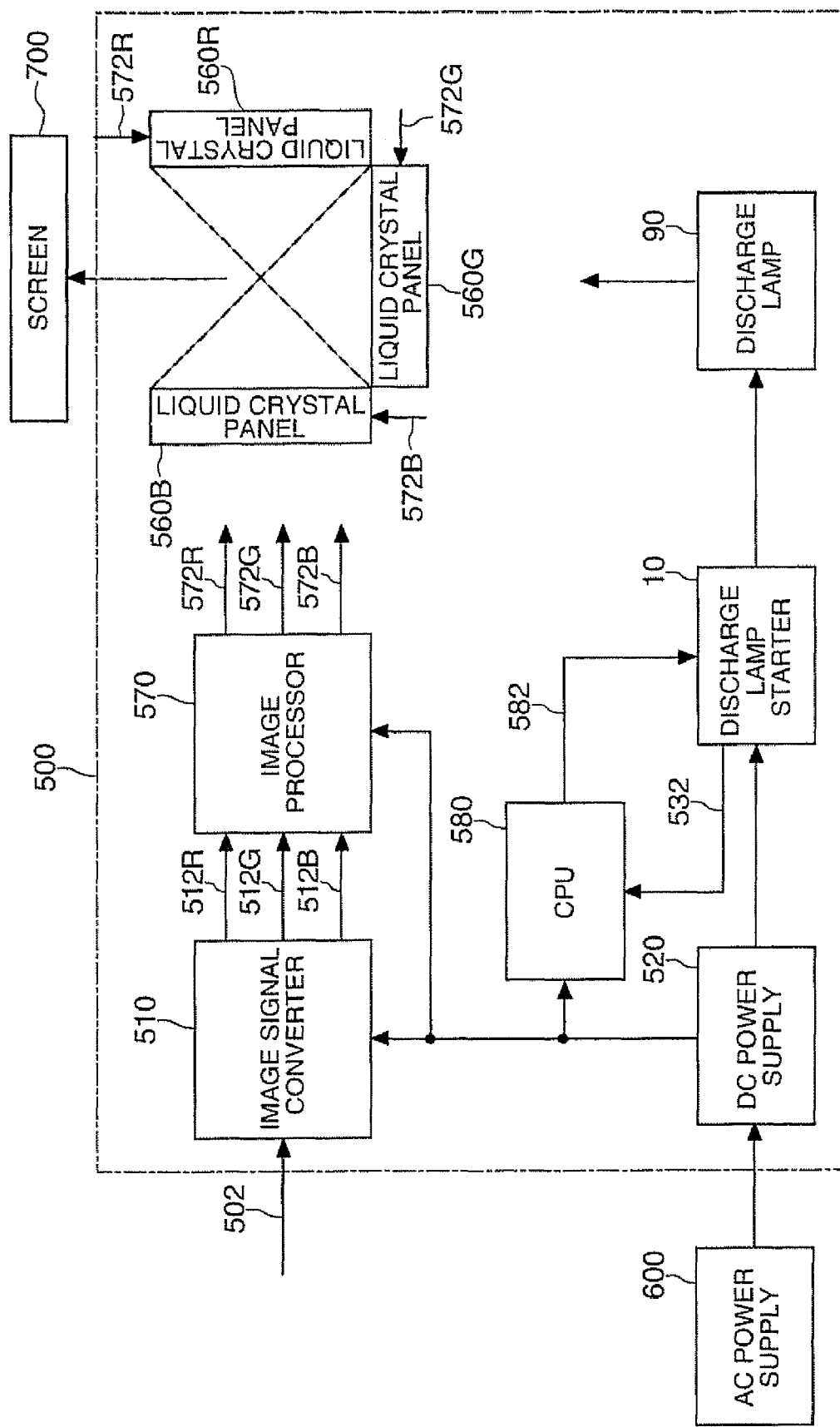
FIG. 13 explains an exemplary configuration of a projector according to an embodiment of the invention.

FIG. 13 shows an example of the circuit configuration of the projector according to the present embodiment. The projector 500 includes not only the optical system described above, but also an image signal converter 510, a DC power supply 520, a discharge lamp lighting apparatus 530, the discharge lamp 90, the liquid crystal panels 560R, 560G, and 560B, and an image processor 570.

The image signal converter 510 converts an externally inputted image signal 502 (such as a luminance-chrominance signal and an analog RGB signal) into a digital RGB signal with a predetermined word length to produce image signals 512R, 512G, and 512B and supplies them to the image processor 570.

The image processor 570 performs image processing on the three image signals 512R, 512G, and 512B and outputs drive signals 572R, 572G, and 5723 for driving the liquid crystal panels 560R, 560G, and 560B.

The DC power supply 520 converts an AC voltage supplied from an external AC power supply 600 into a constant DC voltage and supplies the DC voltage to the image signal converter 510 and the image processor 570 on the secondary side of a transformer (although not illustrated but included in the DC power supply 520), and to the discharge lamp lighting apparatus 530 on the primary side of the transformer.

The discharge lamp lighting apparatus 530 produces a high voltage between the electrodes 92 and 93 of the discharge lamp 90 when the discharge lamp 90 is turned on to cause dielectric breakdown so as to form a discharge path, and then supplies a driving current for allowing the discharge lamp 90 to maintain the discharge.

The liquid crystal panels 560R, 560G, and 560B use the drive signals 572R, 572G, and 572B according to the image signals to modulate the luminance values of the color light beams incident on the respective liquid crystal panels.

A CPU 580 controls all operations of the projector including starting and terminating the projector. When the projector is turned on and the output voltage from the DC power supply 520 becomes a predetermined value, the CPU 580 generates a start signal 582 and supplies it to the discharge lamp lighting apparatus 530. The CPU 580 may receive information 532 on the start status of the discharge lamp 90 from the discharge lamp lighting apparatus 530.

The thus configured projector 500 can suppress decrease in the discharge lamp driving voltage and suppress flickering. It is therefore possible to provide a projector in which the luminance of the discharge lamp 90 is stable and the life of the discharge lamp 90 is extended.

The invention is not limited to the above embodiments, but a variety of changes can be made thereto within the spirit of the invention.

In the above embodiments, the description has been made with reference to the projector using three liquid crystal panels, but the invention is not limited thereto. The invention is also applicable to a projector using one liquid crystal panel, a projector using two liquid crystal panels, and a projector using four or more liquid crystal panels.

In the above embodiments, the description has been made with reference to a transmission-type projector, but the invention is not limited thereto. The invention is also applicable to a reflection-type projector. The word "transmission-type" used herein means that an electro-optic modulator as a light modulator is of light-transmitting type, such as a transmissive liquid crystal panel, and the word "reflection-type" used herein means that the electro-optic modulator as the light modulator is of light-reflecting type, such as a reflective liquid crystal panel and a micromirror light modulator. For example, a DMD (Digital Micromirror Device: a trademark of Texas Instruments) can be used as the micromirror light modulator. When the invention is applied to a reflection-type projector, the same advantageous effects as those provided in a transmission-type projector can also be provided.

The invention is applicable not only to a front projection projector that projects a projection image from the observation side but also to a rear projection projector that projects a projection image from the side opposite the observation side.

The invention encompasses any configuration that is effectively the same as the configuration described with reference to the above embodiments (for example, a configuration having the same function, using the same method, and providing the same result, or a configuration having the same object and providing the same result). The invention also encompasses a configuration that is similar to the configuration described with reference to the above embodiments but has a non-essential portion replaced. The invention also encompasses a configuration providing the same advantageous effect as that provided in the configuration described with reference to the above embodiments or a configuration capable achieving the same object as that of the configuration described with reference to the above embodiments. The invention also encompasses a configuration that is similar to the configuration described with reference to the above embodiments but to which a known technology is added.

The entire disclosure of Japanese Patent Application No. 2008-067664, filed Mar. 17, 2008 is expressly incorporated by reference herein.

What is claimed is:

1. A discharge lamp lighting apparatus comprising:
   a power control circuit that outputs a DC current;
   an AC conversion circuit to which the DC current is inputted, the AC conversion circuit repeatedly reversing the polarity of the DC current between a first polarity and a second polarity at predetermined timings to produce and output a discharge lamp driving AC current, the driving AC current defining a plurality of AC cycles, each of which includes current of the first polarity and current of the second polarity; and
   a controller that controls the AC conversion circuit and the power control circuit, the controller controlling the AC conversion circuit to perform AC conversion control in which the timings at which the polarity of the discharge lamp driving AC current is reversed are controlled, the controller controlling the power control circuit to perform section current control in which the magnitude of the DC current is controlled in accordance with a periodic pattern in each of polarity reverse timing sections to control the ratio of accumulated energy supplied to each electrode of the discharge lamp in the first half of the polarity reverse timing section to that in the second half of the polarity reverse timing section, and the controller controls the power control circuit to change the ratio of accumulated energy over the plurality of AC cycles such that the ratio of accumulated energy in a polarity reverse timing section of one AC cycle is different from the ratio of accumulated energy in a polarity reverse timing section of another AC cycle.

2. The discharge lamp lighting apparatus according to claim 1,
   wherein in the section current control, the magnitude of the DC current is controlled in each of the polarity reverse timing sections in accordance with the periodic pattern in which the accumulated energy ratio is changed in such a way that the accumulated energy supplied to each electrode in the second half of the polarity reverse timing section is greater than or equal to the accumulated energy supplied to each electrode in the first half of the polarity reverse timing section.

3. The discharge lamp lighting apparatus according to claim 2,
   wherein the controller performs the section current control in such a way that the magnitude of the DC current is monotonously increased in the polarity reverse timing sections.

4. A projector comprising the discharge lamp lighting apparatus according to claim 3.

5. A projector comprising the discharge lamp lighting apparatus according to claim 2.

6. The discharge lamp lighting apparatus according to claim 1,
wherein the periodic pattern includes a plurality of segmented periods during each of which the accumulated energy ratio is maintained at the same value, and the accumulated energy ratios in at least two of the segmented periods differ from each other.

7. A projector comprising the discharge lamp lighting apparatus according to claim 6.

8. The discharge lamp lighting apparatus according to claim 1,
wherein the controller performs the section current control in such a way that the average of the DC current in each of the polarity reverse timing sections is controlled to be a fixed value.

9. A projector comprising the discharge lamp lighting apparatus according to claim 8.

10. A projector comprising the discharge lamp lighting apparatus according to claim 1.

11. A method for controlling a discharge lamp lighting apparatus including
a power control circuit that outputs a DC current, and
an AC conversion circuit to which the DC current is inputted, the AC conversion circuit reversing the polarity of the DC current at predetermined timings to produce and output a discharge lamp driving AC current, the driving AC current defining a plurality of AC cycles, each of which includes current of a first polarity and current of a second polarity, the method comprising steps of:
controlling the AC conversion circuit to perform AC conversion control in which the timings at which the polarity of the discharge lamp driving AC current is reversed are controlled; and
controlling the power control circuit to perform section current control in which the magnitude of the DC current is controlled in accordance with a periodic pattern in each of polarity reverse timing sections to control the ratio of accumulated energy supplied to each electrode of the discharge lamp in the first half of the polarity reverse timing section to that in the second half of the polarity reverse timing section, and controlling the power control circuit to change the ratio of accumulated energy over the plurality of AC cycles such that the ratio of accumulated energy in a polarity reverse timing section of one AC cycle is different from the ratio of accumulated energy in a polarity reverse timing section of another AC cycle.

12. A discharge lamp lighting apparatus comprising:
a power control circuit that outputs a DC current;
an AC conversion circuit to which the DC current is inputted, the AC conversion circuit repeatedly reversing the polarity of the DC current between a first polarity and a second polarity at predetermined timings to produce and output a discharge lamp driving AC current; and
a controller that controls the AC conversion circuit and the power control circuit, the controller controlling the AC conversion circuit to perform AC conversion control in which the timings at which the polarity of the discharge lamp driving AC current is reversed are controlled, the controller controlling the power control circuit to perform section current control in which the magnitude of the DC current is controlled in accordance with a periodic pattern in each of polarity reverse timing sections to control the ratio of accumulated energy supplied to each electrode of the discharge lamp in the first half of the polarity reverse timing section to that in the second half of the polarity reverse timing section,
the periodic pattern including a plurality of segmented periods during each of which the accumulated energy ratio is maintained at the same value, and the accumulated energy ratios in at least two of the segmented periods differing from each other.

13. The discharge lamp lighting apparatus according to claim 12, wherein in the section current control, the magnitude of the DC current is controlled in each of the polarity reverse timing sections in accordance with the periodic pattern in which the accumulated energy ratio is changed in such a way that the accumulated energy supplied to each electrode in the second half of the polarity reverse timing section is greater than or equal to the accumulated energy supplied to each electrode in the first half of the polarity reverse timing section.

14. The discharge lamp lighting apparatus according to claim 13,
wherein the controller performs the section current control in such a way that the magnitude of the DC current is monotonously increased in the polarity reverse timing sections.

15. A projector comprising the discharge lamp lighting apparatus according to claim 14.

16. A projector comprising the discharge lamp lighting apparatus according to claim 13.

17. The discharge lamp lighting apparatus according to claim 12,
wherein the controller performs the section current control in such a way that the average of the DC current in each of the polarity reverse timing sections is controlled to be a fixed value.

18. A projector comprising the discharge lamp lighting apparatus according to claim 17.

19. A projector comprising the discharge lamp lighting apparatus according to claim 12.

20. A method for controlling a discharge lamp lighting apparatus including
a power control circuit that outputs a DC current, and
an AC conversion circuit to which the DC current is inputted, the AC conversion circuit reversing the polarity of the DC current at predetermined timings to produce and output a discharge lamp driving AC current, the method comprising steps of:
controlling the AC conversion circuit to perform AC conversion control in which the timings at which the polarity of the discharge lamp driving AC current is reversed are controlled; and
controlling the power control circuit to perform section current control in which the magnitude of the DC current is controlled in accordance with a periodic pattern in each of polarity reverse timing-sections to control the ratio of accumulated energy supplied to each electrode of the discharge lamp in the first half of the polarity reverse timing section to that in the second half of the polarity reverse timing section;
the periodic pattern including a plurality of segmented periods during each of which the accumulated energy ratio is maintained at the same value, and the accumulated energy ratios in at least two of the segmented periods differing from each other.

* * * * *